United States Patent
Benari

(10) Patent No.: US 8,140,668 B2
(45) Date of Patent: Mar. 20, 2012

(54) PRE-SCHEDULING THE TIMELINES OF VIRTUAL MACHINES

(75) Inventor: Amos Benari, Yokneam Hamoshava (IL)

(73) Assignee: Red Hat Israel, Ltd., Raanana (IL)

( * ) Notice: Subject to any disclaimer, the term of this patent is extended or adjusted under 35 U.S.C. 154(b) by 225 days.

(21) Appl. No.: 12/490,868

(22) Filed: Jun. 24, 2009

(65) Prior Publication Data

US 2010/0332643 A1 Dec. 30, 2010

(51) Int. Cl.
*G06F 15/173* (2006.01)
*G06F 9/46* (2006.01)
*G06F 9/455* (2006.01)

(52) U.S. Cl. ............. 709/224; 709/226; 718/1; 718/105

(58) Field of Classification Search ......................... None
See application file for complete search history.

(56) References Cited

U.S. PATENT DOCUMENTS

| | | | |
|---|---|---|---|
| 2009/0187776 A1* | 7/2009 | Baba et al. | 713/320 |
| 2010/0070978 A1* | 3/2010 | Chawla et al. | 718/105 |
| 2010/0138830 A1* | 6/2010 | Astete et al. | 718/1 |
| 2010/0153945 A1* | 6/2010 | Bansal et al. | 718/1 |

* cited by examiner

*Primary Examiner* — Wen-Tai Lin
(74) *Attorney, Agent, or Firm* — Lowenstein Sandler PC

(57) ABSTRACT

A host controller pre-schedules the timelines of virtual machines that run on a host cluster. In one embodiment, the host controller uses a plurality of timers to determine the start times of the virtual machines. The host controller starts the virtual machines on the host cluster over a time span according to the configurable timelines recorded in the timers. The start times of the virtual machines can be spread over the time span to prevent a load spike at any particular time instance. The virtual machines are up and running on the hosts by a pre-determined time to provide virtual desktops to remote clients. The timers may be configured as a calendar.

15 Claims, 4 Drawing Sheets

| | 6 | 7 | 8 | ... | 17 | 18 |
|---|---|---|---|---|---|---|
| M | Start $G_1$(6:10) $G_2$(6:30) $G_3$(6:50) | Start $G_4$(7:10) $G_5$(7:30) $G_6$(7:50) | | | | Suspend $G_1$-$G_6$ (19:00) |
| Tu | Resume $G_1$(6:10) $G_2$(6:30) $G_3$(6:50) | Resume $G_4$(7:10) $G_5$(7:30) $G_6$(7:50) | | | | Suspend $G_1$-$G_6$ (19:00) |
| W | ... | | | | | ... |
| Th | ... | | | | | |
| F | Resume $G_1$(6:10) $G_2$(6:30) $G_3$(6:50) | Resume $G_4$(7:10) $G_5$(7:30) $G_6$(7:50) | | | | Stop $G_1$-$G_6$ (18:00) |
| Sa/Su | N/A | N/A | N/A | N/A | N/A | N/A |

← CALENDAR 220

PRE-SCHEDULING THE TIMELINES OF VIRTUAL MACHINES

TECHNICAL FIELD

Embodiments of the present invention relate to a computer system, and more specifically, to virtual machine management.

BACKGROUND

A virtual machine is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware of the host computer, making the use of the virtual machine transparent to the guest operating system and the user of the computer.

A host computer can run multiple virtual machines simultaneously. Multiple host computers can be clustered together to provide a large number of virtual machines to an enterprise. In an enterprise, virtual machines may need to be shut down or suspended at the end of each work day to perform certain maintenance tasks (e.g., software upgrades, backup, etc.). At the beginning of the next work day when the workers come in, all of the virtual machines will be started at approximately the same time. Starting a large number of virtual machines can create a load spike that degrades the system performance.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
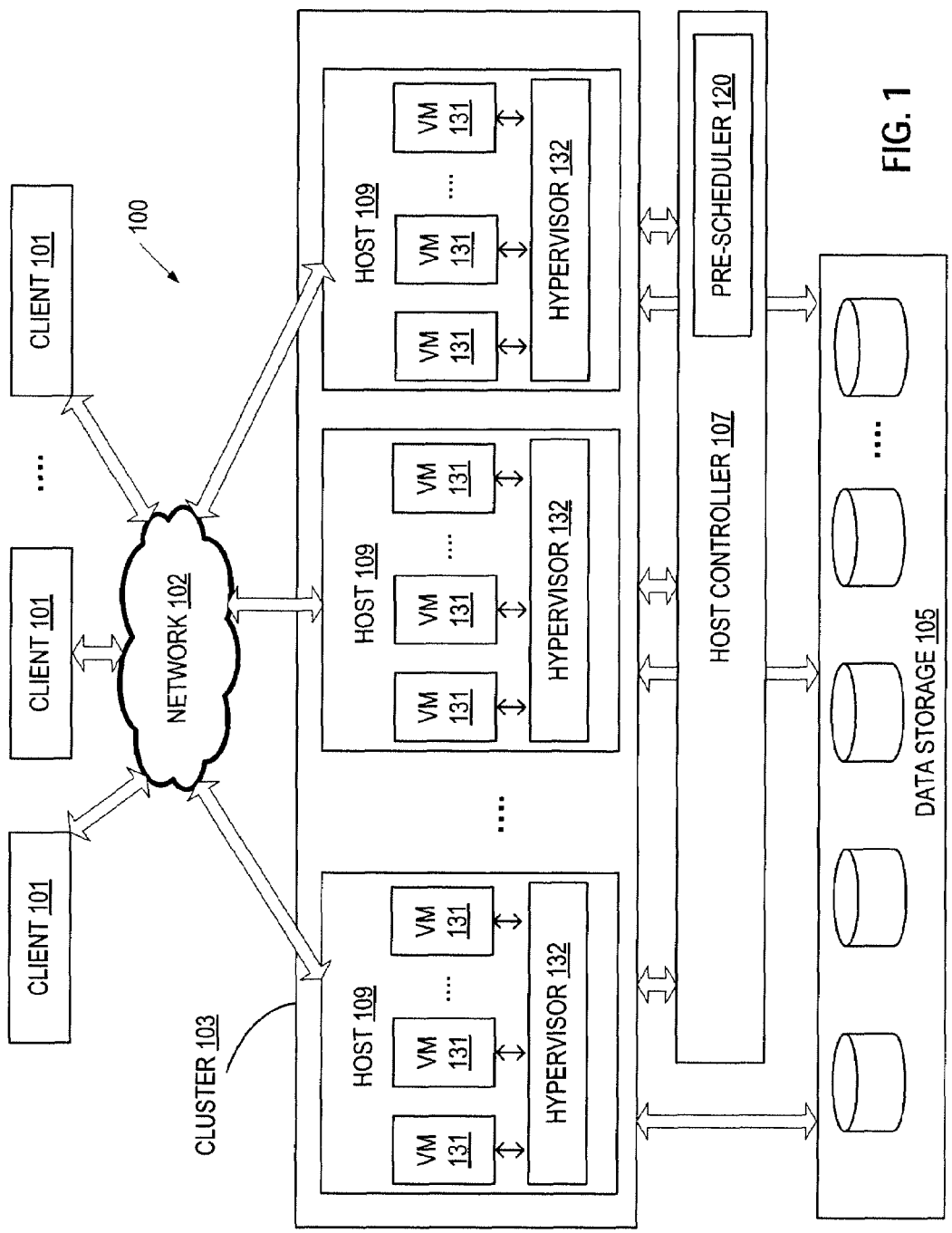
FIG. 1 is a block diagram illustrating one embodiment of a host cluster controlled by a host controller.

Described herein is a method and system for pre-scheduling the timelines of virtual machines that run on a host cluster. In one embodiment, a host controller uses a plurality of timers to determine the start times of the virtual machines. The host controller starts the virtual machines on the host cluster over a time span according to the configurable timelines recorded in the timers. The start times of the virtual machines can be spread over the time span to prevent a load spike at any particular time instance. The virtual machines are up and running on the hosts by a pre-determined time to provide virtual desktops to remote clients. In one embodiment, the timers may be configured as a calendar.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "starting", "running", "recording", "distributing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 includes a cluster of hosts 103 (also referred to as "cluster" or "host cluster") coupled to one or more clients 101 over a network 102. The network 102 may be a private network (e.g., a local area network (LAN), a wide area network (WAN), intranet, etc.) or a public network (e.g., the Internet). The cluster 103 includes a plurality of host computers 109 (also referred to as "hosts"). The cluster 103 is also coupled to data storage 105. The data storage 105 includes one or more mass storage devices (e.g., disks), which form a storage pool shared by all of the hosts 109 in the cluster 103.

The clients 101 may include computing devices that have a wide range of processing capabilities. The client 101 may run client applications such as a Web browser and a graphic user interface (GUI). The client 101 may also run other client applications, which receive multimedia data streams or other data from one or more host computers 109 and re-direct the received data to a local display or other user interface.

Each host 109 may run one or more virtual machines 131. Each virtual machine 131 runs a guest operating system (OS) that may be different from one virtual machine to another. The guest OS may include Microsoft Windows, Linux, Solaris, Mac OS, etc. Each host 109 may include a hypervisor 132 that emulates the underlying hardware platform for the virtual machines 131. The hypervisor 132 may also be known as a virtual machine monitor (VMM) or a kernel-based hypervisor. In some embodiments, the hypervisor 132 is part of a host operating system.

Each virtual machine 131 can be accessed by one or more of the clients 101 over the network 102. In one scenario, each virtual machine 131 provides a virtual desktop for the client 101. From the user's point of view, the virtual desktop functions as a physical desktop (e.g., a personal computer) and is indistinguishable from a physical desktop.

The hosts 109 can be managed by a host controller 107. The host controller 107 may be a computer coupled to the cluster 103 directly or via a network. Alternatively, the host controller 107 may be part of one of the hosts 109. The host controller 107 may add a virtual machine, delete a virtual machine, balance the load on the cluster 103, power on/off the hosts 109, provide directory service to the virtual machines 131, and perform other managerial functions.

According to one embodiment of the present invention, the host controller 107 includes a pre-scheduler 120 to schedule the time periods during which the virtual machines 131 are active. The start time of each virtual machine 131 can be scheduled such that the virtual machines 131 do not start at the same time. In an enterprise environment, each virtual machine 131 provides a virtual desktop for the client 101. At the end of a work day, the virtual machines 131 are either suspended or shut down. In the morning of the next work day, all of the virtual desktop users arrive at approximately the same time (e.g., 8:00 AM), and start their virtual desktops at approximately the same time. Starting all of the virtual machines 131 at approximately the same time can create a load spike on the hosts 109. As the active periods of time for the virtual machines 131 are predictable, the pre-scheduler 120 can pre-schedule the start time of each virtual machine 131 such that the virtual machines 131 are up and running before the users arrive without creating a load spike. For example, the start times of the virtual machines 131 can be staggered over a time span (e.g., a couple of hours) to spread out the load. The virtual machines 131 can be grouped into multiple groups of a moderate size (e.g., 10 virtual machines per group), with each group starting at a pre-determined time.

Operations of the pre-scheduler 120 will be described in greater detail with references to FIGS. 2-4.

Figures 2, 3:
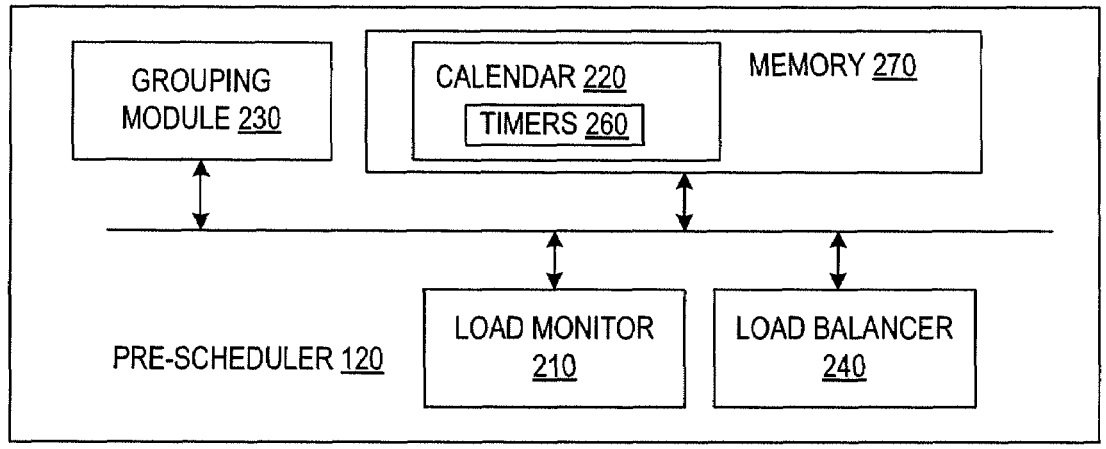
FIG. 2 is a block diagram illustrating one embodiment of a pre-scheduler in the host controller of FIG. 1.
FIG. 3 is an embodiment of a calendar according to which the pre-scheduler schedules the virtual machines.

FIG. 2 illustrates an embodiment of the pre-scheduler 120 in the host controller 107. The pre-scheduler 120 includes a load monitor 210 to monitor the load on each host 109 (e.g., CPU utilization and memory usage). For each host 109 that is currently active, the load monitor 210 monitors the CPU utilization (also referred to as "CPU usage") of the host 109, and the lengths of time during which the CPU utilization is above a high CPU utilization border (e.g., 80%) or under a low utilization border (e.g., 20%). The load monitor 210 can determine whether there is a load spike on each of the hosts 109.

In one embodiment, the pre-scheduler 120 pre-schedules the timelines (e.g., start time, suspend/stop time, resume time, etc.) of the virtual machines 131 according to a calendar 220 stored in a memory 270. In one embodiment, the calendar 220 is implemented by a plurality of timers 260, which are configurable by a user (e.g., a system administrator). The calendar 220 may have a 24 (hour)/7 (day) format to define, at each time instance of a day, which virtual machine is to start, suspend/stop, etc. The calendar 220 may schedule the timelines on a recurring basis; e.g., the timelines are repeated every week. Alternatively, the calendar 220 may be used to schedule a different timeline every single day. The virtual machines 131 may be divided into several groups by a grouping module 230. For example, each virtual machine 131 in a group may be assigned to run on a different host to avoid overloading a single host. As a result, the start times of the virtual machines 131 are spread over a time span. The load created by starting the virtual machines 131 can be evenly distributed over the time span and over the hosts 109 in the cluster 103.

The calendar 220 is configurable by a user (e.g., a system administrator) to adapt the operations of the virtual machines 131 to changing work environment and schedules. Alternatively, the calendar 220 can be automatically modified by a load balancer 240 that modifies the load distribution specified by the calendar 220. For example, if the load monitor 210 observes a load spike when a group of virtual machines start, the user or the load balancer 240 may remove one or more virtual machines from the group and records a different start time for these one or more virtual machines in the calendar 220.

FIG. 3 illustrates an embodiment of the calendar 220. In this embodiment, the calendar 220 records, for each day of the week, the timelines of six groups of virtual machines ($G_1$-$G_6$). In alternative embodiments, the virtual machines may be pre-scheduled individually instead of as groups. For example, on Mondays, the start times of the six groups are staggered over a period of two hours. The calendar 220 also records the suspend time for the six groups at the end of the work day on Mondays. Similarly, the calendar 220 records the resume times and suspend times for Tuesdays, Wednesdays and Thursdays. On Fridays, the calendar 220 records the resume times and the stop times of the six groups. No activities are specified for Saturday and Sunday. Assume that the calendar 220 is used for an organization in which all of the virtual desktop users report to work on 8 AM every Monday to Friday. The embodiment of the calendar 220 allows that all of the six groups of virtual machines are started and ready for the users by 8:00 AM on these work days.

The embodiment of the calendar 220 schedules the timelines of the virtual machines on a weekly recurring basis. However, it is understood that the calendar 220 may have a different timeline for every single day, if necessary. The calendar 220 can also be modified by the pre-scheduler 120 when there is a change to the host 109, the users, work projects, or any factor relating to the work environment or affecting the work schedule.

In one embodiment, the calendar 220 can include the information that associates a given virtual machine with a particular host. Thus, the virtual machine will start on a pre-scheduled time on the particular host. The calendar 220 can also include configurable data of the virtual machines. For example, a virtual machine may be scheduled to run on 2 cores of a host on Mondays and only 1 core on the rest of the days. As another example, a virtual machine may be scheduled to use 2 gigabytes of memory on a host on Mondays and only 1 gigabytes of memory on the rest of the days.

Figure 4:
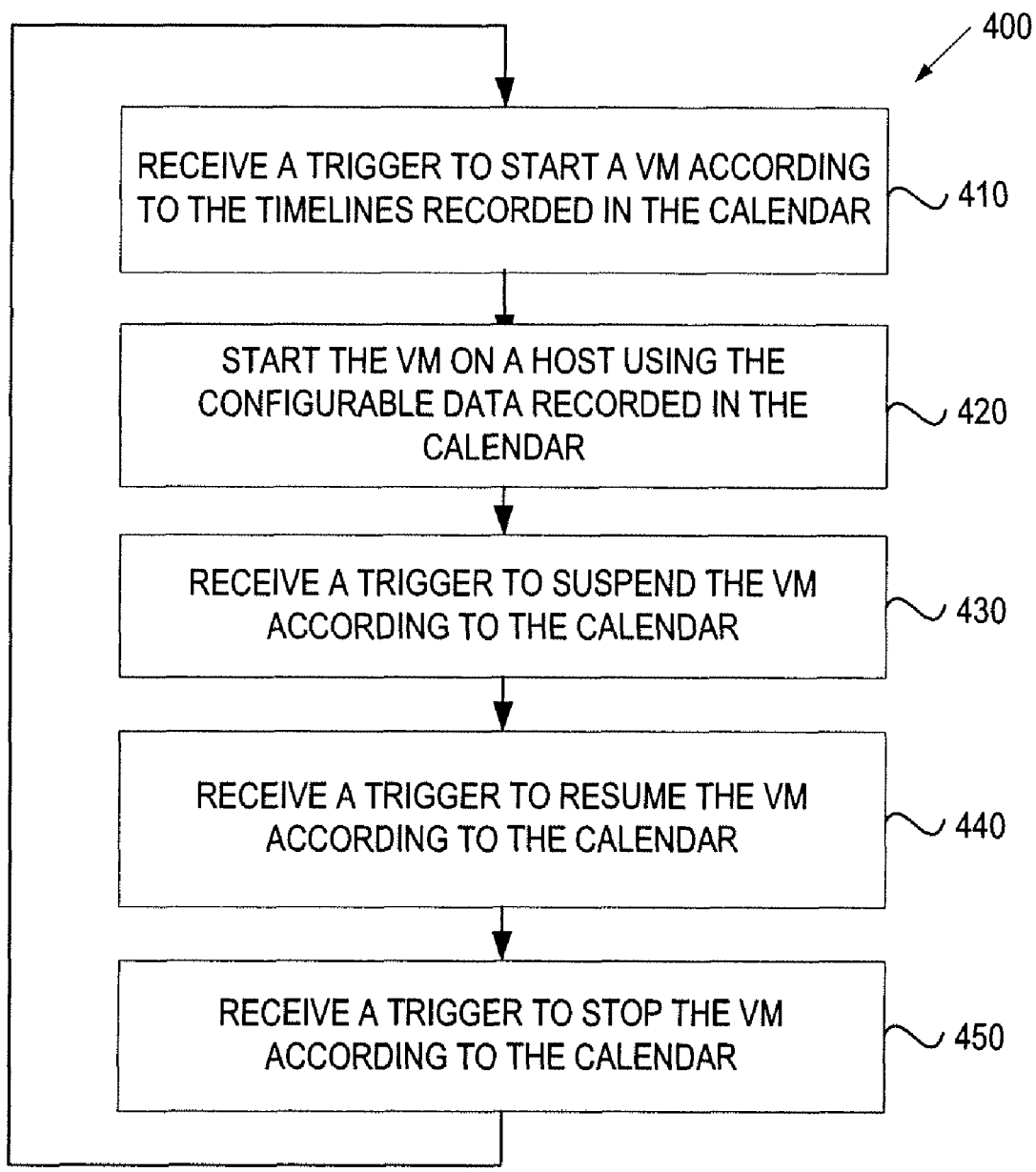
FIG. 4 is a flow diagram illustrating a method for pre-scheduling the virtual machines, in accordance with one embodiment of the present invention.

FIG. 4 is a flow diagram illustrating one embodiment of a method 400 for pre-scheduling virtual machines. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the pre-scheduler 120 as a background process (FIGS. 1 and 2).

Referring to FIG. 4, the pre-scheduler 120 waits for a trigger to start a virtual machine according to the timelines recorded in the timers 260 that are configured as the calendar 220 (block 410). The trigger may be incurred by one or more of the timers 260 that expire on pre-set time instances or intervals. When the pre-scheduler 120 receives the trigger, the pre-scheduler 120 starts the virtual machine on a host according to configurable data recorded in the calendar 220 (block 420). The configurable data may include an identifier of the host that runs the virtual machine, the number of cores to be used by the virtual machine, the memory usage of the virtual machine, etc. The pre-scheduler 120 then receives a trigger to suspend the virtual machine (block 430). The trigger arrives according to the timelines recorded in the calendar 220. The pre-scheduler 120 suspends the virtual machine in response to the trigger. Subsequently, the pre-scheduler 120 receives a trigger to resume the virtual machine (block 440). The trigger arrives according to the timelines recorded in the calendar 220. The pre-scheduler 120 then resumes the virtual machine in response to the trigger. When a trigger is received to stop the virtual machine according to the calendar 220, the pre-scheduler 120 stops the virtual machine in response to the trigger (block 450). The method 400 continues in the background when a next trigger to start the virtual machine is received by the pre-scheduler 120.

It is understood that some of the operations described above in the method 400 may be omitted. For example, a virtual machine may be started and stopped on a daily basis without being suspended or resumed. A virtual machine may also be stopped (without being suspended) on one day and suspended (without being stopped) on the next day.

Figure 5:
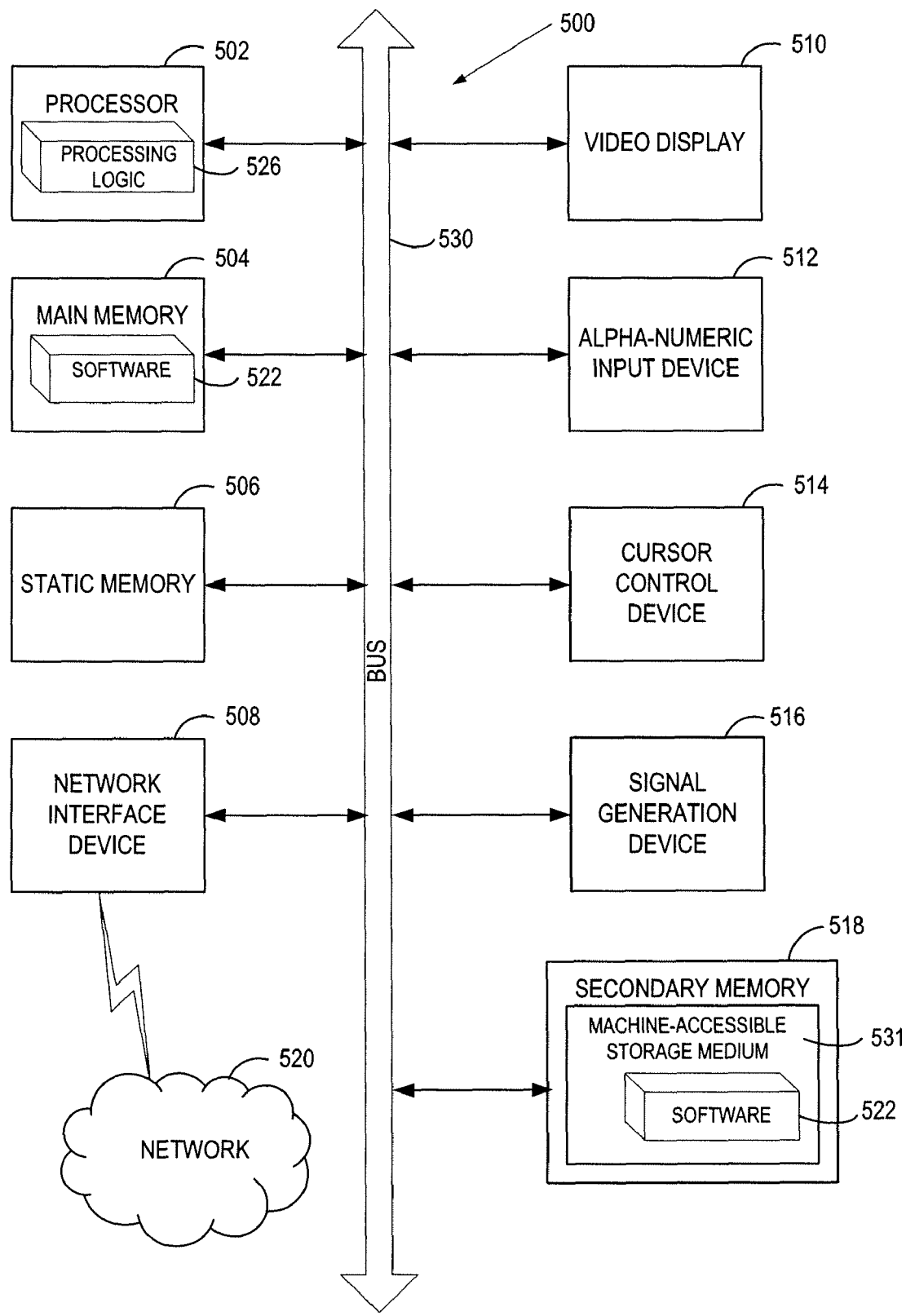
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500; the main memory 504 and the processing device 502 also constituting machine-readable storage media. The software 522 may further be transmitted or received over a network 520 via the network interface device 508.

The machine-readable storage medium 531 may include the pre-scheduler 120 of FIG. 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
    starting, by a host controller, a plurality of virtual machines on a plurality of hosts over a time span according to configurable timelines recorded in a plurality of timers stored in memory, wherein start times of the virtual machines are spread over the time span; and
    running the virtual machines on the hosts by a pre-determined time to provide virtual desktops to remote clients;
    wherein starting the plurality of virtual machines further comprises:
        observing a load spike during the time span when the plurality of virtual machines are started; and
        rescheduling one or more of the plurality of virtual machines to start at a different time such that the load spike created by starting the plurality of virtual machines is evenly distributed over the time span when the plurality of virtual machines are started; and
    wherein the time span comprises a time interval when the plurality of virtual machines are started and does not include the run time of the plurality of virtual machines.

2. The method of claim 1, wherein the virtual machines are divided into a plurality of groups, the method further comprises:
    recording, in the timers, a different start time for each group.

3. The method of claim 1, further comprising:
    recording, in the timers, a start time and a stop time for each virtual machine on a recurring basis.

4. The method of claim 1, further comprising:
    configuring the timers as a calendar.

5. A non-transitory computer readable storage medium including instructions that, when executed by a processing system, cause the processing system to perform a method comprising:
    starting a plurality of virtual machines on a plurality of hosts over a time span according to configurable timelines recorded in a plurality of timers stored in memory, wherein start times of the virtual machines are spread over the time span; and
    running the virtual machines on the hosts by a pre-determined time to provide virtual desktops to remote clients;
    wherein starting the plurality of virtual machines further comprises:
        observing a load spike during the time span when the plurality of virtual machines are started; and
        rescheduling one or more of the plurality of virtual machines to start at a different time such that the load spike created by starting the plurality of virtual machines is evenly distributed over the time span when the plurality of virtual machines are started; and
    wherein the time span comprises a time interval when the plurality of virtual machines are started and does not include the run time of the plurality of virtual machines.

6. The non-transitory computer readable storage medium of claim 5, wherein the virtual machines are divided into a plurality of groups, the method further comprises:
    recording, in the timers, a different start time for each group.

7. The non-transitory computer readable storage medium of claim 5, further comprising:
    recording, in the timers, a start time and a stop time for each virtual machine on a recurring basis.

8. The non-transitory computer readable storage medium of claim 5, further comprising:
    configuring the timers as a calendar.

9. A system comprising:
    memory to store a plurality of timers; and
    a host controller coupled to a plurality of hosts that run a plurality of virtual machines, the host controller to start the virtual machines on the hosts over a time span according to configurable timelines recorded in the timers and to run the virtual machines on the hosts by a pre-determined time;
    wherein the host controller to start the plurality of virtual machines further comprises:
        a load monitor of the host controller to observe a load spike during the time span when the plurality of virtual machines are started; and
        a load balancer of the host controller to reschedule one or more of the plurality of virtual machines to start at a different time such that the load spike created by starting the plurality of virtual machines is evenly distributed over the time span when the plurality of virtual machines are started; and
    wherein the time span comprises a time interval when the plurality of virtual machines are started and does not include the run time of the plurality of virtual machines.

10. The system of claim 9, further comprising:
    a grouping module to divide the virtual machines into a plurality of groups, the timers to record a different start time for each group.

11. The system of claim 9, wherein the timers records a start time and a stop time for each virtual machine on a recurring basis.

12. The system of claim 9, wherein the timers are configured as a 24 (hour)/7 (day) calendar.

13. The method of claim 1, wherein running the virtual machines further comprises running each virtual machine according to configurable data recorded in the timers, the configurable data including an identifier of a host that runs the virtual machine, the number of cores to be used by the virtual machine, and the memory usage of the virtual machine.

14. The non-transitory computer readable storage medium of claim 5, wherein running the virtual machines further comprises running each virtual machine according to configurable data recorded in the timers, the configurable data including an identifier of a host that runs the virtual machine, the number of cores to be used by the virtual machine, and the memory usage of the virtual machine.

15. The system of claim 9, wherein the timers record configurable data for each virtual machine, the configurable data including an identifier of a host that runs the virtual machine, the number of cores to be used by the virtual machine, and the memory usage of the virtual machine.

* * * * *